United States Patent
Guan et al.

(10) Patent No.: US 7,106,554 B2
(45) Date of Patent: Sep. 12, 2006

(54) PERPENDICULAR MAGNETIC WRITER WITH MAGNETIC POTENTIAL CONTROL SHIELD

(75) Inventors: Lijie Guan, Milpitas, CA (US); Hung Liang Hu, Los Altos Hills, CA (US); Yaw Shing Tang, Saratoga, CA (US); Kochan Ju, Monte Sereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 147 days.

(21) Appl. No.: 10/411,345

(22) Filed: Apr. 10, 2003

(65) Prior Publication Data

US 2004/0201918 A1    Oct. 14, 2004

(51) Int. Cl.
*G11B 5/11* (2006.01)
*G11B 5/187* (2006.01)

(52) U.S. Cl. ..................... 360/125; 360/119
(58) Field of Classification Search ............. 360/317, 360/125, 126
See application file for complete search history.

(56) References Cited

U.S. PATENT DOCUMENTS

| | | | |
|---|---|---|---|
| 4,656,546 A | | 4/1987 | Mallory ................ 360/110 |
| 4,935,832 A | | 6/1990 | Das et al. ............. 360/112 |
| 5,075,956 A | | 12/1991 | Das ..................... 29/603 |
| 5,809,637 A | | 9/1998 | Rottmayer ............. 29/603.15 |
| 5,995,341 A | * | 11/1999 | Tanaka et al. ......... 360/125 |
| 6,667,848 B1 | * | 12/2003 | Khizroev et al. ...... 360/125 |
| 6,721,129 B1 | * | 4/2004 | Lam .................... 360/119 |
| 6,728,065 B1 | * | 4/2004 | Batra et al. .......... 360/126 |
| 6,816,339 B1 | * | 11/2004 | Litvinov et al. ....... 360/125 |
| 2002/0176214 A1 | * | 11/2002 | Shukh et al. .......... 360/317 |
| 2003/0039068 A1 | * | 2/2003 | Crawford et al. ...... 360/126 |

OTHER PUBLICATIONS

S.H. Charap et al., "Thermal Stability of Recorded Information at High Densities," IEEE Trans. on Magnets, vol. 33, No. 1, Jan. 1997, pp. 978-983.
Shun-ichi Iwasaki et al., "An Analysis for the Magnetization Made for High Density Magnetic Recording," IEEE Trans. on Magnetics vol. MAG-13, No. 5, Sep. 1977, pp. 1272-1277.
Zhengyong Zhang et al., "Magnetic Recording Demonstration Over 100 Gb/in Squared," IEEE Trans. on Magnetics, vol. 38, No. 5, Sep. 2002, pp. 1861-1866.
M. Mallary et al., "One Terabit per Square Inch Perpendicular Recording Conceptual Design," IEEE Trans. on Magnetics, vol. 38, No. 4, Jul. 2002, pp. 1719-1724.

* cited by examiner

*Primary Examiner*—Jefferson Evans
(74) *Attorney, Agent, or Firm*—Saile Ackerman LLC; Stephen B. Ackerman

(57) ABSTRACT

Conventional perpendicular writers that utilize an extended return pole are subject to large undershoot fields. This problem has been reduced by replacing the prior art extended return pole by one whose magnetic potential has been increased relative to both the main and return poles. In a first embodiment, a second non-magnetic gap is inserted between the extended return pole and the return pole. In a second embodiment, the extended return pole is made very thin, thereby increasing its reluctance, while a third embodiment combines both reluctance-increasing features in a single design.

13 Claims, 4 Drawing Sheets

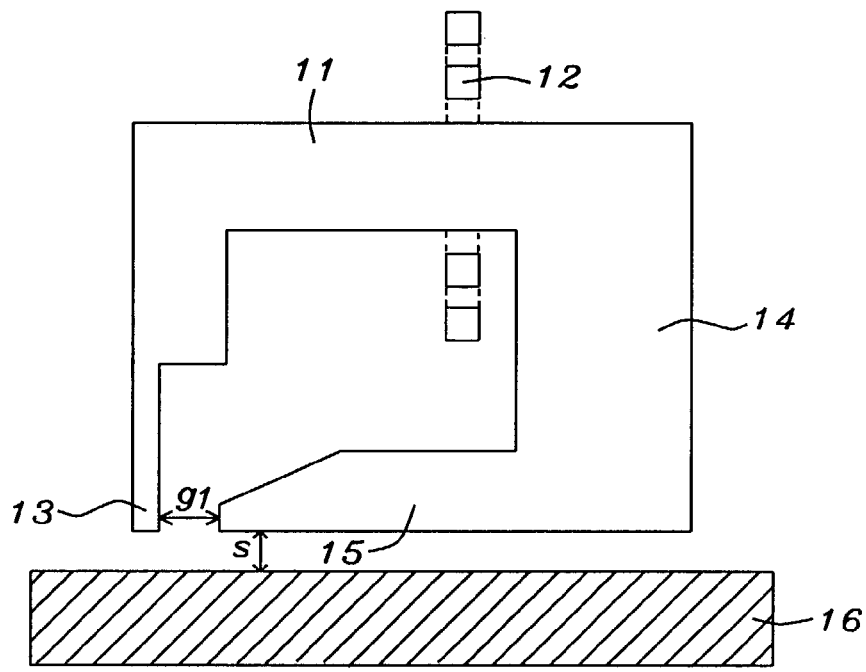
FIG. 1 – Prior Art
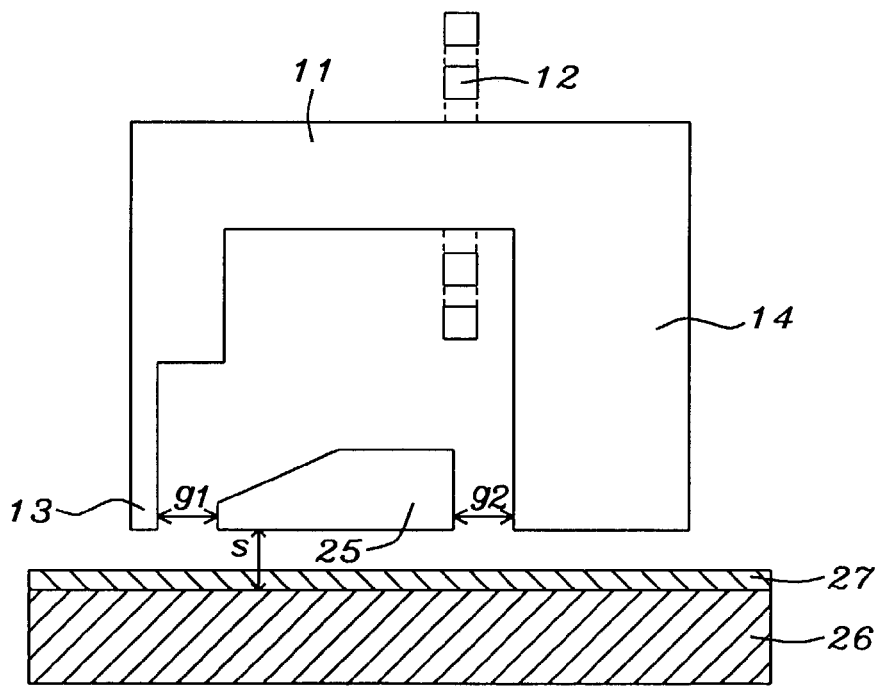
FIG. 2

PERPENDICULAR MAGNETIC WRITER WITH MAGNETIC POTENTIAL CONTROL SHIELD

FIELD OF THE INVENTION

The invention relates to the general field of magnetic disk systems with particular reference to magnetic write heads for perpendicular designs.

BACKGROUND OF THE INVENTION

As magnetic recording is pushed to higher areal densities, perpendicular recording may offer advantages in thermal stability over longitudinal recording, thus delaying arrival at the super-paramagnetic limit [1,2]. Another advantage of perpendicular recording with single pole (SP) head and perpendicular media, with a soft underlayer (SUL), is the ability to produce a larger write field than that of a ring head to record on relatively thick media with high anisotropy constant. Although these assumed advantages indicate that perpendicular recording has high recording density potential, perpendicular recording does not, thus far, surpass the highest recording density achieved using thermally stable AFC media [3]. This is the result of the insufficient field gradients produced by a perpendicular SP head in both the cross-track and down-track directions, thus limiting the achievable recording density.

Introduction of a downstream shield, extending from the return pole, has been proposed to increase the trailing edge field gradient as well as the in-plane head field component [4,5]. An example of this is shown in FIG. 1. Magnetic yoke 11 is surrounded by field coil 12 and includes pole tip 13. Introduction of a downstream shield, extending from the return pole, has been proposed to increase the trailing edge field gradient as well as the in-plane head field component [4,5]. An example of this is shown in FIG. 1. Magnetic yoke 11 is surrounded by the coil 12 and includes pole tip 13. Without an extended return pole, total magnetic flux generated by coil 12 is conducted from main pole 13 into soft underlayer 16 with a certain spread width in the down-track direction, and eventually collected by the return pole 14 to complete the magnetic circuit. As shown in FIG. 1, the extended return pole 15 intercepts partial magnetic flux from the main pole. Thus, the field spread width is reduced, i.e. field gradient is increased.

However, extending return pole 14 as far as the vicinity of main pole 13 introduces a large undershoot perpendicular field at the trailing edge, similar to the case of a longitudinal ring head, and also reduces the maximum field in the recording media. The present invention discloses how this problem may be overcome.

REFERENCES (1) H. Charap, Pu-Ling Lu, and Yanjun He, "Thermal Stability of recording information at high densities", IEEE Trans. Magn., vol. 33, 978 (1997)
(2) S. Iwasaki, and Y. Nakamura, "An analysis for the magnetization mode for high density magnetic recording", IEEE Trans. Magn, vol. 13, 1272 (1977)
(3) Z. Zhang, et al., "Magnetic recording demonstration over 100 Gbit/in2", paper BA-02, INTERMAG conference
(4) M. Mallary, "Vertical Magnetic Recording Arrangement", U.S. Pat. No. 4,656,546, Apr. 7, 1987, Re #33, 949 with S. Das, Jun. 2, 1992.
(5) M. Mallary et al, "1 Tb/in2 Perpendicular Recording Conceptual Design", IEEE trans. mag. 38 no. Jul. 4, 2002 pp. 1719–1724.

A routine search of the prior art was performed with the following references of interest being found:
In U.S. Pat. No. 5,809,637, Rottmayer describes a magnetic head assembly with an extended shield section. U.S. Pat. No. 4,935,832 (Das et al) and U.S. Pat. No. 5,075,956 (Das) show recording heads with side shields.

SUMMARY OF THE INVENTION

It has been an object of at least one embodiment of the present invention to provide a magnetic writer suitable for vertical recording.

Another object of at least one embodiment of the present invention has been that said writer have maximal vertical field and minimal undershoot field.

These objects have been achieved in a structure that provides greater control over the path taken by the flux, particularly near the surface of the writeable media. The conventional extended return pole of the prior art has been replaced by one whose magnetic potential has been increased relative to both the main and return poles. In a first embodiment, a second non-magnetic gap is inserted between the extended return pole and the return pole. In a second embodiment, the extended return pole is made very thin, thereby increasing its reluctance for flux propagation, while a third embodiment combines both reluctance-increasing features in a single design.

BRIEF DESCRIPTION OF THE DRAWINGS

FIG. 1 shows a vertical magnetic writer of the prior art.
FIG. 2 shows a first embodiment of the invention.
FIG. 4b shows a variation of the second embodiment seen in FIG. 4a.

DESCRIPTION OF THE PREFERRED EMBODIMENTS

Figure 3:
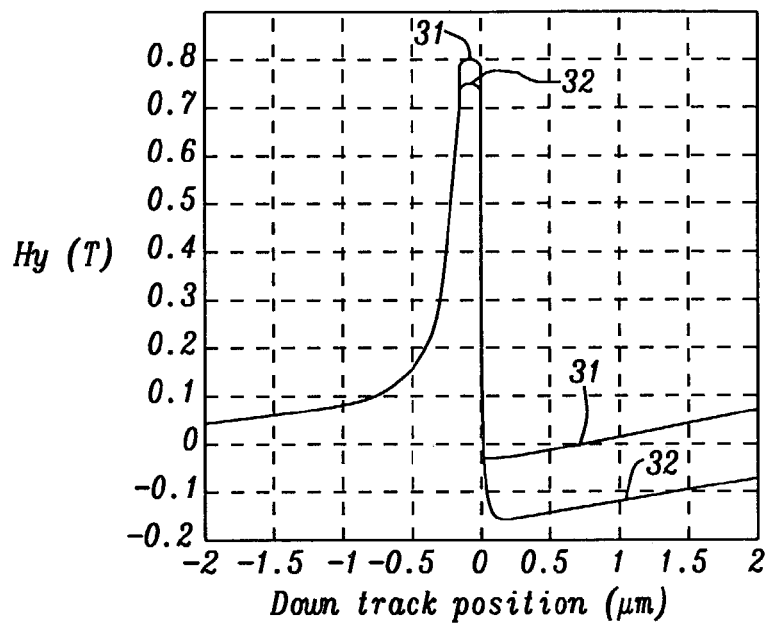
FIG. 3 compares the writing characteristics of the first embodiment to the prior art.

In this invention, we disclose a perpendicular magnetic writer design with a magnetic potential control shield (MPCS). This novel design not only increases the field gradient significantly, but also offers the capability of controlling the undershoot field at the trailing edge.

1st Embodiment

A first embodiment of the invention is illustrated in FIG. 2. Magnetic yoke 11 may be typically thought of as comprising two parts, a vertical part that terminates in pole tip 13 (typically up to about 2 microns thick and up to about 12 microns long) and a horizontal part (typically between about 1 and 5 microns thick and between about 2 and 12 microns long) that is connected to return pole 14. Suitable materials for the yoke include (but are not limited to) Co, Ni, Fe, and their alloys, including amorphous magnetic materials. Suitable materials for return pole 14 include permalloy and other Co, CoFe, and NiFeCo alloys or amorphous compounds and it is between about 1 and 5 microns thick and between about 2 and 12 microns long. Field coil 12 surrounds the yoke.

Suitable materials for vertical recording layer 27 include CoCrPtO and CoCrFeB. This layer is typically between about 0.01 and 0.03 microns thick while the underlayer, of magnetically soft material, 26 is typically between about 0.2 and 1 microns thick. The spacing from pole tip 13 to SUL 26 is denoted as S (typically between about 0.02 and 0.2 microns).

A magnetic potential control shield (MPCS) 25 is placed between the main pole tip 13 and return pole 14, being separated therefrom by gaps g1 and g2, respectively. Typical materials for the MPCS include (but are not limited to) Ni, Fe, Co, NiFeCo, their alloys, or amorphous metals and it is between about 0.1 and 5 microns thick and between about 1 and 10 microns long. Note that these two gaps may be adjusted independently of one another.

The first non-magnetic gap g1 ranges in width from about S to 2S, within a range of from 0.02 and 0.4 microns. It intercepts the magnetic flux from the main pole 13 and creates a large field gradient over the distance of g1. The second gap g2 introduces magnetic reluctance into the path between the MPCS 25 and return pole 14, thereby determining the magnetic potential of the MPCS relative to the return pole and hence the magnitude of the undershoot field. Non-magnetic gap g2 has a width of between about 0.01 and 2 microns.

This enhancement of the field gradient provided by the MPCS is very critical to the achievement of additional increases in perpendicular recording density. The significance of the presence of g2 is shown in FIG. 3, where the perpendicular fields of perpendicular writers with a MPCS and with a conventional extended return pole are compared. In the calculation, the same geometries for the MPCS and for the extended return pole were used, except that g2=0 for the extended return pole case. Curve 31 is for the invention (i.e. with MPCS) while curve 32 is for the prior art device.

For the prior art head, the total potential jump from main pole to return pole occurs directly across g1. As a result, a large undershoot is generated at the shield edge. With a non-zero g2, the magnetic potential of the MPCS is raised due to the reluctance gap. Therefore, less potential change occurs between the main pole and the MPCS so that the magnitude of the undershoot field is decreased to less than about 0.5 kOe. The undershoot field can also be adjusted with changing the non-zero g2, Additionally, the second gap reduces magnetic flux leakage from the main pole to the MPCS. The maximum perpendicular field is increased about 500 Oe, or more, as compared to a head having a conventional extended return pole.

$2^{nd}$ Embodiment

Figure 4A:
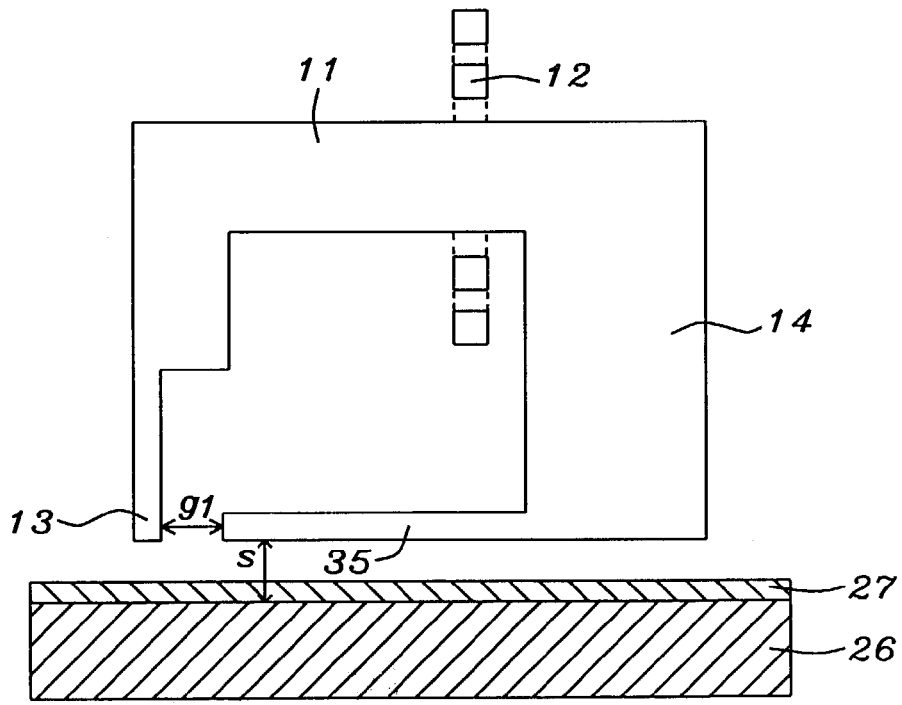
FIG. 4a shows a second embodiment of the invention.

The concept of magnetic potential/flux leakage control can be also applied to perpendicular writers through a modification of the extended return pole itself. As shown in FIG. 4a, the vertical thickness of the modified extended return pole 35 (which is between about 1 and 10 microns long) is reduced to be of the order of S, making it between about 0.01 and 0.2 microns thick. Suitable materials for this modified extended return pole include NiFe, CoFeNi, FeAlN, CoFe, their alloys, and amorphous magnetic materials.

Figure 5:
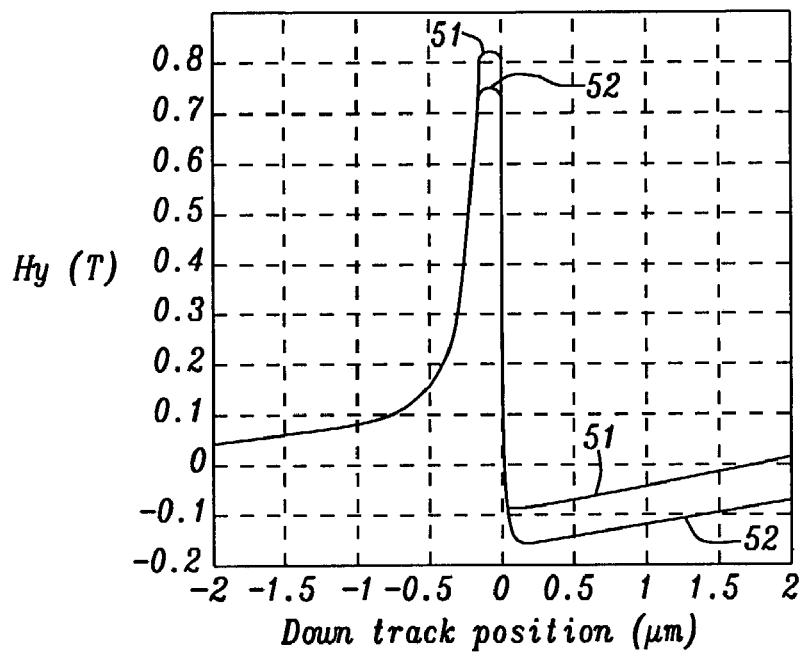
FIG. 5 compares the writing characteristics of the second embodiment to the prior art.

As a result, the flux leakage from the main pole to the extended return pole is significantly reduced so the extended portion of the return pole acts as an ideal shield without causing large undershoot. We refer this modified head as a flux-leakage-reducing (FLR) extended return pole head. The calculated fields comparing the characteristics of the extended return pole to the prior art are plotted in FIG. 5, with curve 51 being for a writer using the FLR extended return pole and curve 52 for a conventional extended return pole. For curve 51, the thickness of the FLR extended return pole was set equal to g1 (between about 0.02 and 0.5 microns). As can be seen, the maximum perpendicular field is increased by about 1 kOe over the prior art while the magnitude of the undershoot field was reduced to less than about 1 kOe, which is about 1 kOe less than the prior art.

Note that by 'prior art' in this context we mean a device that is the same in every respect as the invented device except that the extended return pole (15 in FIG. 1) has been replaced by the extended return pole of the invented device (in this particular case element 35 in FIG. 4a)

Figure 4B:
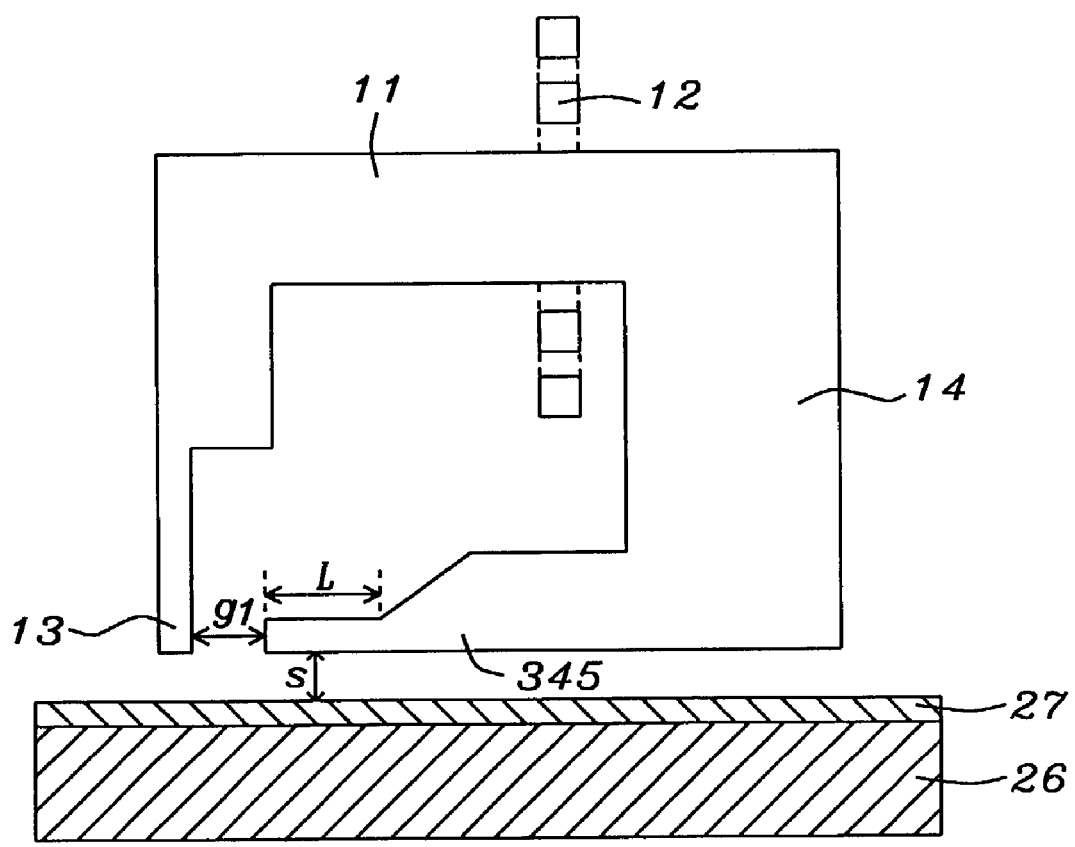

In FIG. 4b we show a variation of the structure shown in FIG. 4a. Here the FLR extended return pole 345 is made up of two sections, the first section (closest to pole tip 13) being thinner than the second section. The length L of this first section ranges from 2×g1 to the full separation between the main and return poles (in which case it reduces to the configuration already seen as FIG. 4a). Actual L values are in the range of 0.1 to 5 μm.

$3^{rd}$ Embodiment

Figure 6:
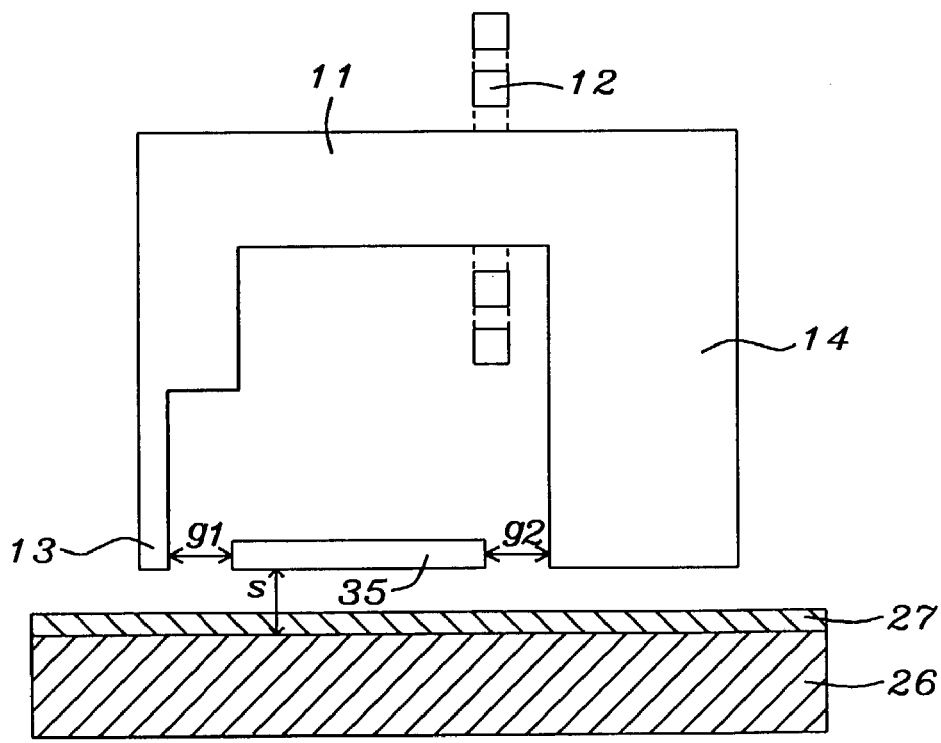
FIG. 6 shows a third embodiment of the invention.

FIG. 6 shows a third embodiment of the invention. As should be apparent, it combines the novel features of the first two embodiments into a single structure. Its manufacturing cost is only slightly more than that of the first two embodiments but it offers the advantage of greater control over where the return flux encounters the most reluctance.

What is claimed is:

1. A perpendicular magnetic writer comprising:
a magnetic yoke having first and second non-parallel parts, said first part terminating as a pole tip having a lower surface;
said pole tip lower surface being located a distance S from a recording surface;
a conductive coil that surrounds said yoke;
a return pole having first and second ends;
the first end of the return pole being in magnetic contact with the magnetic yoke's second part, extending therefrom so that its second end is a surface that is coplanar with said pole tip lower surface;
a control shield, located between said pole tip and said return pole, having a lower surface that is coplanar with said pole tip and return pole lower surfaces;
a first non-magnetic gap between said pole tip and said control shield; and
a second non-magnetic gap between said control shield and said return pole.

2. The magnetic writer described in claim 1 wherein the magnetic yoke is Co, Ni, Fe, an alloy that comprise Co, Ni, and Fe, or an amorphous magnetic material.

3. The magnetic writer described in claim 1 wherein the distance S is less than about 0.08 microns.

4. The magnetic writer described in claim 1 wherein said control shield is NiFe, CoFe, CoFeNi, or FeAlN.

5. The magnetic writer described in claim 1 wherein said control shield is between about 0.1 and 5 microns thick and between about 1 and 12 microns long.

6. The magnetic writer described in claim 1 wherein said writer has an undershoot field that is less than about 0.5 kOe.

7. The magnetic writer described in claim 1 wherein said first non-magnetic gap has a width of between about 0.02 and 0.5 microns.

8. The magnetic writer described in claim 1 wherein said second non-magnetic gap has a width of between about 0.01 and 2 microns.

9. The magnetic writer described in claim 1 wherein said return pole is NiFe, CoFe, CoFeNi, or FeAlN.

10. The magnetic writer described in claim 1 wherein said return pole is between about 1 and 5 microns thick and between about 2 and 12 microns long.

11. The magnetic writer described in claim 1 wherein said first part of said yoke is less than or equal to about 2 microns thick and less than or equal to about 5 microns long.

12. The magnetic writer described in claim 1 wherein said second part of said yoke is between about 1 and 5 microns thick and between about 2 and 12 microns long.

13. A perpendicular magnetic writer comprising:
a magnetic yoke having first and second non-parallel parts, said first part terminating as a pole tip having a lower surface;
said pole tip lower surface being parallel to a recording surface and located a distance S therefrom;
a conductive coil that surrounds said yoke;
a return pole having first and second ends;
the first end of the return pole being in magnetic contact with the magnetic yokes second part, extending therefrom so that its second end is a surface that is coplanar with said pole tip lower surface;
an extended return pole, having a thickness that is no greater than 6×S, located between said pole tip and said return pole and having a lower surface that is coplanar with said pole tip and return pole lower surfaces;
a first non-magnetic gap between said pole tip and said extended return pole; and
a second non-magnetic gap between said extended return pole and said return pole.

* * * * *